Dec. 7, 1937.  E. J. KINGSBURY  2,101,396
AUTOMATIC MACHINE TOOL WITH WORK CLAMPS
Filed March 29, 1935  6 Sheets-Sheet 2

Inventor:
Edward J. Kingsbury,
by
Att'ys.

Dec. 7, 1937. E. J. KINGSBURY 2,101,396
AUTOMATIC MACHINE TOOL WITH WORK CLAMPS
Filed March 29, 1935 6 Sheets-Sheet 3

Inventor:
Edward J. Kingsbury,
by Mason Fenwick,
Att'ys.

UNITED STATES PATENT OFFICE 2,101,396

AUTOMATIC MACHINE TOOL WITH WORK CLAMPS

Edward Joslin Kingsbury, Keene, N. H.

Application March 29, 1935, Serial No. 13,740

4 Claims. (Cl. 77—62)

This invention relates to improvements in machine tools and is more particularly concerned with the coordination of a working unit with work presenting and clamping means.

One of the features of the present invention is the provision of means by which the working units are not released for operation until the work is properly positioned for their activity.

Another feature is the provision of a power work delivering and clamping device in association with means whereby the manual operation of starting a cycle of machine activity causes the presentation and clamping of the work, the release of the working unit or units, the return of the working unit or units, and the release of the article of work.

Another feature of the present invention is the provision of such a system in which the proper succession of events is assured through the arrangement of the several parts and their constructive and functional association with one another.

With these and other objects in view, an illustrative form of practicing the invention is shown on the accompanying drawings, in which.

Figures 1, 8:
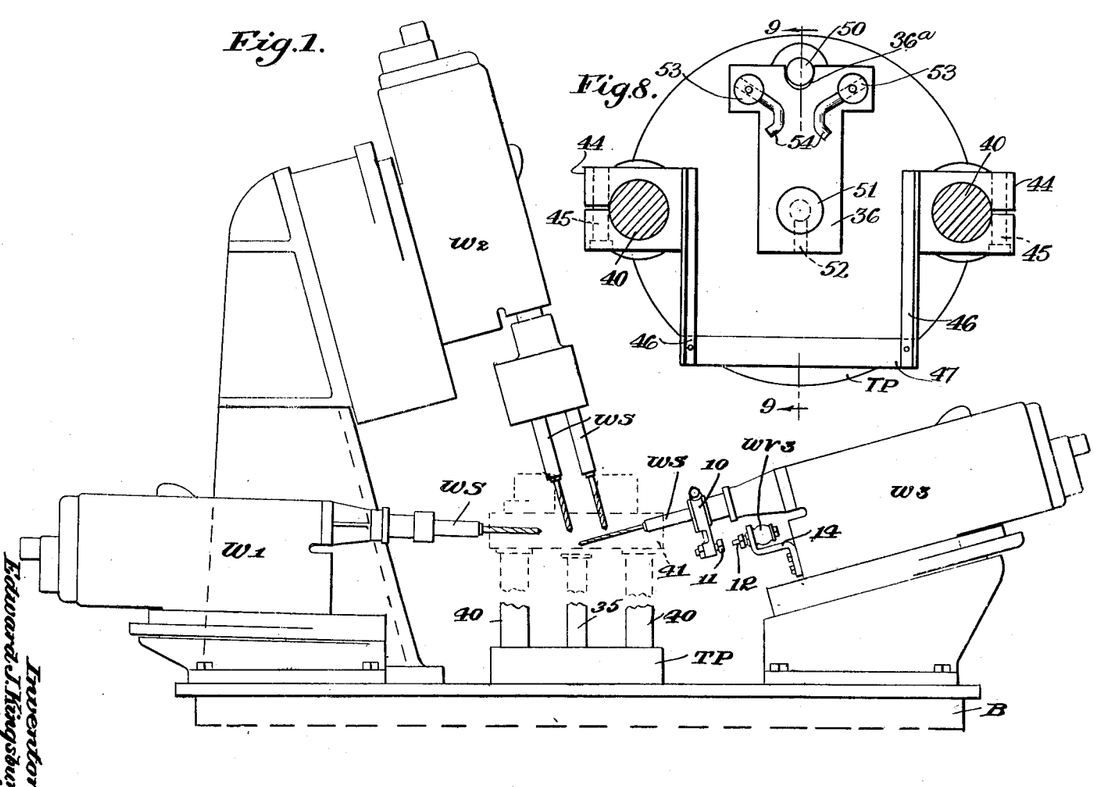
Figure 1 is a side elevation of a machine tool in which the present invention is embodied.
Figure 8 is a horizontal sectional view substantially on line 8—8 of Fig. 3.
Figure 2:
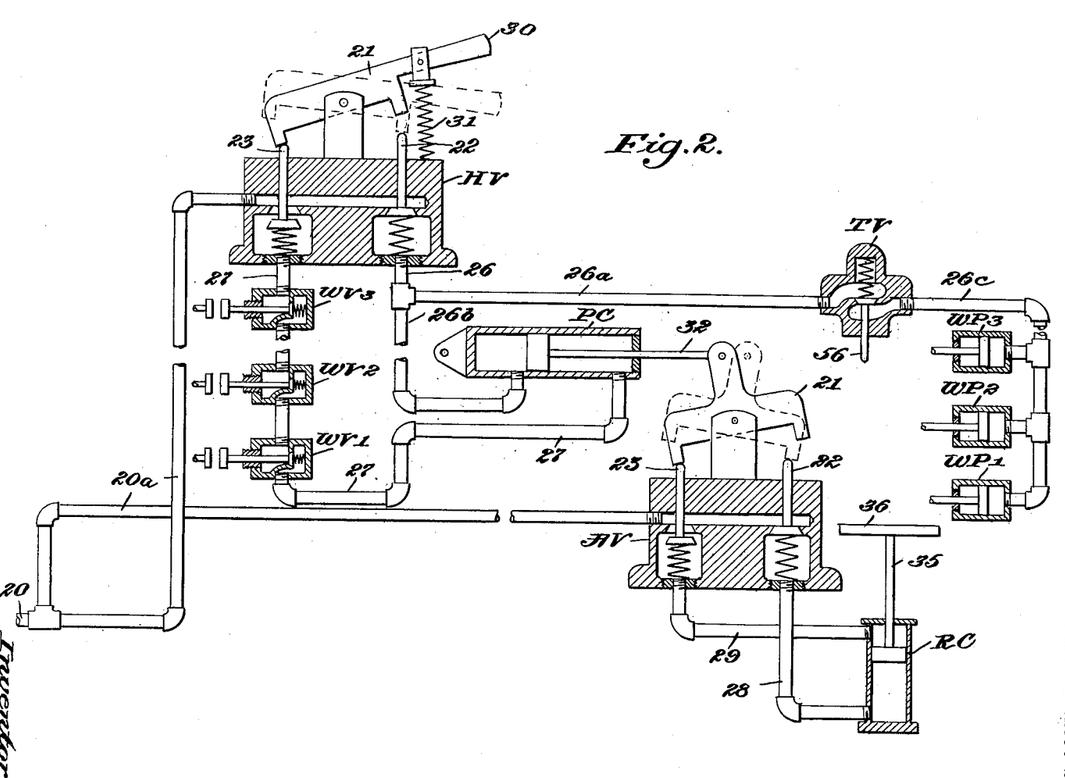
Figure 2 is a view showing the connection of the several elements when a fluid pressure system is employed.
Figure 2A:
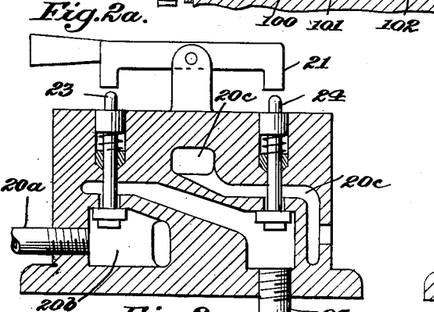
Figure 2a is a sectional view of the valve HV taken along the line indicated by the line 2a—2a of Fig. 2c, with the operating handle at the left instead of at the right as in Fig. 2.
Figure 2B:
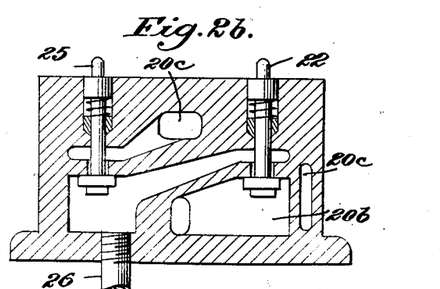
Figure 2b is a sectional view of the valve HV taken along the line indicated by the line 2b—2b of Fig. 2c.

In Figs. 1 and 2 is a diagrammatic illustration of the application of the invention to a compound machine tool having three working units W1, W2, W3, each of which has at least one working spindle WS which is rotated and also reciprocated back and forth to produce a tool operation upon the article being manufactured.

Figure 10:
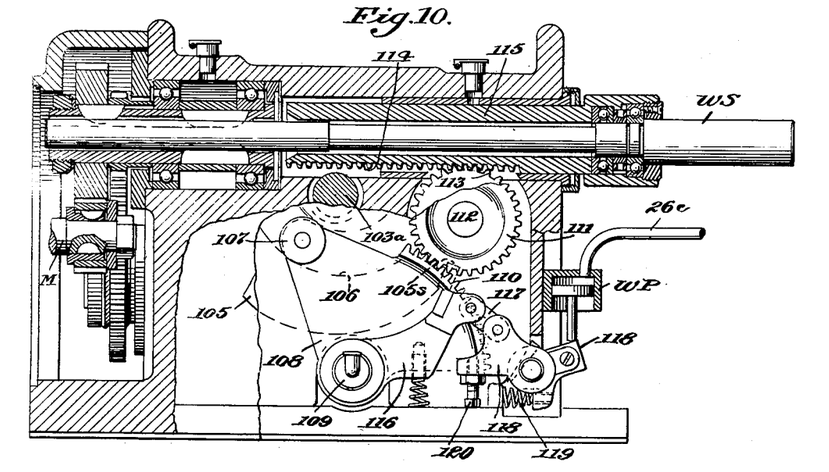
Figure 10 is a fragmentary sectional view showing the controlling means for the machine and the supporting and operating parts for the spindle.
Figure 11:
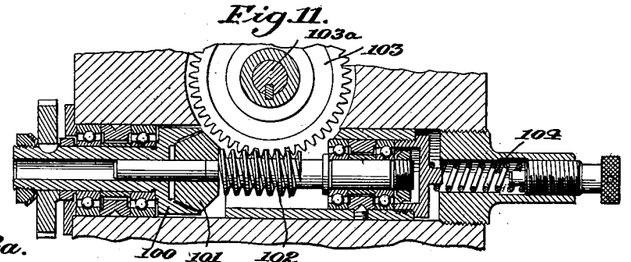
Figure 11 is a longitudinal sectional view on the line of the actuating cross shaft.

One manner of constructing each of these working units is illustratively shown in Figs. 10 and 11, on the basis of my prior Patent 1,780,083 granted October 28, 1930. In this arrangement, the motor M is connected for driving one clutch member 100 which is normally engaged with the second clutch member 101 fixed to a shaft having a worm 102 thereon in mesh with a worm wheel 103. The clutch member 101 is constantly urged toward engagement with the clutch member 100 by the pressure spring 104. Worm wheel 103 is mounted on a shaft 103a which supports a cam 105 having a track 106 for receiving a roller 107 mounted on a rock arm 108 having a pivot 109 on the unit frame. This rock arm also has teeth 110 engaged with the teeth of a pinion 111 on a shaft 112 which likewise has secured thereon a pinion 113 engaged with a rack 114 on a quill 115 which supports the work spindle WS, this spindle being driven from the motor in any suitable manner. A stop lug 105s on cam 105 cooperates with a detent element 116 which is joined by a link 117 to a releasing means 118, which normally is pressed for movement in a counterclockwise direction by the spring 119, and is provided with a stop member 120 which limits its movement when the arm 108 completes its movement in a clockwise direction. In operation, the motor drives the spindle WS and also the clutch member 100 and thus, through the aforesaid train, the cam 105 is rotated so that its track (after initiation of a cycle) causes the rock arm 108 to rock in a counterclockwise direction so that its rack 110 causes rotation of the pinions 111, 113, and thus a forward feeding movement of the spindle WS. The cam track thereafter operates to retract the spindle to withdrawn position by causing a clockwise movement of the rock arm 108. This clockwise movement terminates when the stop lug 105s encounters the member 116, and thus is brought to a standstill, as the relative pressure from the member 116 is exerted through link 117 and the releasing device 118 to the stop 120 to provide a positive limitation, so that the cam is brought to a standstill. This causes the worm 102 to move axially in the worm wheel 103 (now at a standstill) for disengaging the clutch members 100, 101. The cylinder and piston structure WP is connected to the releasing device 118, and operates when energized to cause this device to rock in a clockwise direction against the action of spring 119, so that the member 116 is given a clockwise movement; and thus the stop lug 105s is released and a further advancement of the cam 105 is permitted, with the result that the roller 102 and clutch member 101 are moved axially by spring 104, and a further cycle begins.

Likewise, each working unit includes a release device which is actuated as the spindle returns to its withdrawn position. One such device is illustrated in Fig. 1 for the working unit W3 as comprising a bracket 10 which is secured to the corresponding spindle WS and has an abutment screw 11 thereon which contacts with the stem 12 of the supervising valve WV3 carried by a bracket 14 upon the work unit W3. Corresponding supervising valves WV1, WV2 are provided for the working units W1 and W2, as conventionally shown in Fig. 2.

The three working units W1, W2, W3 are mounted on a base or frame structure B which likewise supports the bottom plate TP of the holder for the article of work as will be described in detail hereinafter.

Figure 2C:
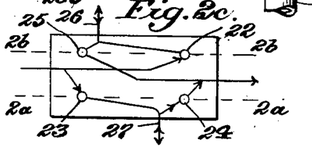
Figure 2c is a diagrammatic view in plan of the fluid paths through the valve HV.

A source of fluid under pressure is connected by a conduit 20 (Fig. 2) to branch pipes 20a which lead respectively to control valves HV and AV. The control valves HV and AV are provided with inlet cored passage 20b and an exhaust cored passage 20c. Inlet valves 22 and 23 (Fig. 2c) alternately connect the branch pipe 20a of each valve to the conduits 26, 27 or 28, 29 respectively. The exhaust valves 24 and 25 serve to connect these passages in proper sequence alternately with the exhaust. Each of these control valves includes a rocking actuator 21 which has fingers for actuation upon individual stems of the inlet valves 22 and 23 and the outlet valves 24 and 25 in the sequence indicated in Figs. 2, 2a, 2b and 2c. The control valve HV is constructed as a hand-actuated device and is employed for starting a cycle by depressing a handle 30 into the dotted line position (Fig. 2); also, it has a return spring 31 which moves the parts into the full line position (Fig. 2) when the handle is released.

The conduit 26 has two branches 26a and 26b. The branch 26a leads through a supervising valve TV and thence by a conduit 26c to the individual cylinder and piston release mechanisms WP1, WP2 and WP3 of the working units W1, W2 and W3. The branch conduit 26b leads to one end of the pressure cylinder PC which has a piston rod 32 connected to the rocking actuator 21 of the valve AV.

The conduit 27 extends in series through the supervising valves WV1, WV2 and WV3 to the other end of the power cylinder PC, but is closed so long as any one of the valves WV1, WV2 or WV3 is closed.

The conduit 28 is connected to the lower end of the ram cylinder RC, while the conduit 29 is connected to the upper end of this ram cylinder RC. The ram cylinder RC has a plunger 35 with a pressure plate 36 which operates for raising the article of work into position for the tooling thereof.

Figure 3:
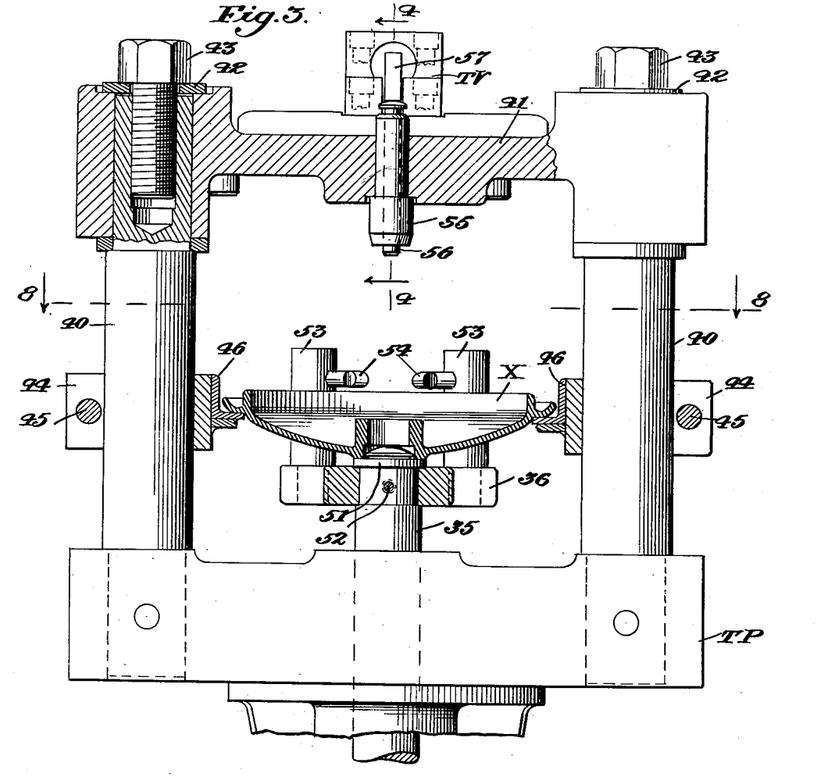
Figure 3 is a side elevation, with parts in section, substantially on line 3—3 of Fig. 5, showing the work receiving and clamping devices on a larger scale.

The structure for holding the article of work includes this pressure plate 36 and other parts, as shown in Figs. 3 to 9. The base B supports the bottom plate TP through which the ram plunger 35 extends, and also supports columns or tension members 40 which are connected at the top by a stationary fixture clamping strut 41 which is held fixedly to the tension members 40 by clamping washers 42 and screws 43. The tension members 40 also support split sleeves 44 which are held clamped by screws 45 in adjusted position along the height of the tension members 40. These split rings 44 support angle pieces 46 which are held parallel to one another by a strut 47 connected thereto. These angle pieces 46 present receiving flanges for the article of work X when introduced into the mechanism (Fig. 3).

The bottom plate TP also fixedly supports a guide pin 50 which is received by a notch 36a in the pressure plate 36 (Figs. 8 and 9) and serves to prevent relative rotational movements of this pressure plate with respect to the axis of the ram plunger 35. The plate 36 is received on the reduced upper end of the plunger 35 and fits against a shoulder thereof (Figs. 3 and 9) and is held in position by a flanged retaining pin 51 and a lock screw 52.

The pressure plate 36 supports a pair of stop pins 53 having guide fingers 54, the stop pins and fingers cooperating with the flanges of members 46 to properly locate the article of work X in position prior to the actuation of the ram plunger 35, and to hold the work in position for proper presentation during the forward movement of the plunger 35.

Figure 4:
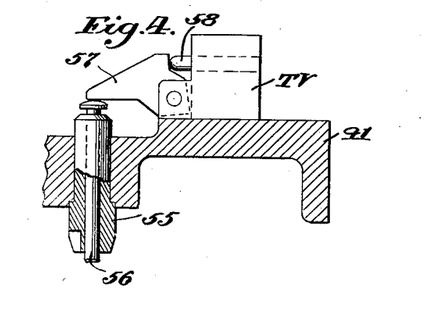
Figure 4 is a fragmentary detail view substantially on line 4—4 of Fig. 3.
Figure 5:
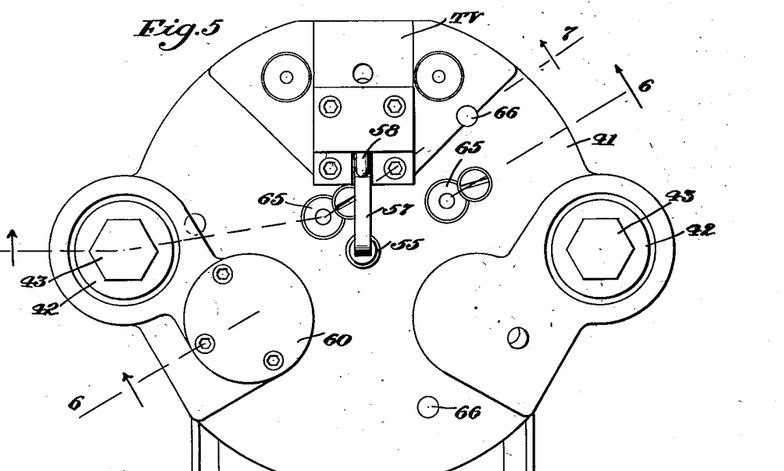
Figure 5 is a top plan view of the work receiving and clamping structure.
Figure 6:
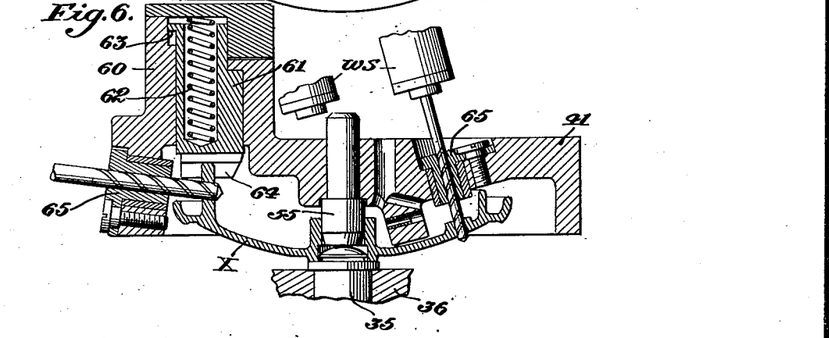
Figure 6 is a fragmentary upright sectional view substantially on line 6—6 of Fig. 5.
Figure 7:
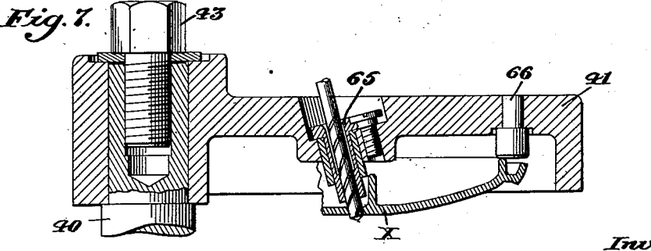
Figure 7 is a similar view substantially on line 7—7 of Fig. 5.

The strut 41 supports, in the illustrative form, a hollow fixture pin 55 which enters a central hole of the article of work X and thus locates the work with respect to the working units W1, W2, W3. The hollow fixture pin 55 receives a pressure pin 56 which at its upper end engages with a crank lever 57 which in turn bears against a stem 58 of the valve TV (Fig. 2), this valve being mounted on the strut 41 (Figs. 3, 4 and 5).

The strut 41 (Fig. 6) also comprises a boss 60 which receives a plunger 61 that is normally held depressed by a spring 62, the downward movement thereof being limited by a stop plunger 63. The lower end of the plunger 61 has a portion 64 for engagement with a portion of the article of work X to prevent rotation of this article of work about the axis of the plunger 35.

Furthermore, the strut 41 may be provided with a suitable number of fixture bushings 65 in proper arrangement for receiving and guiding drills mounted in the work spindles WS. Likewise, it is desirable to employ stop pins 66 in the strut member 41 opposite the plunger 64 for engagement with the work X to prevent rocking of the work about any horizontal axis during the operations upon it.

Figure 9:
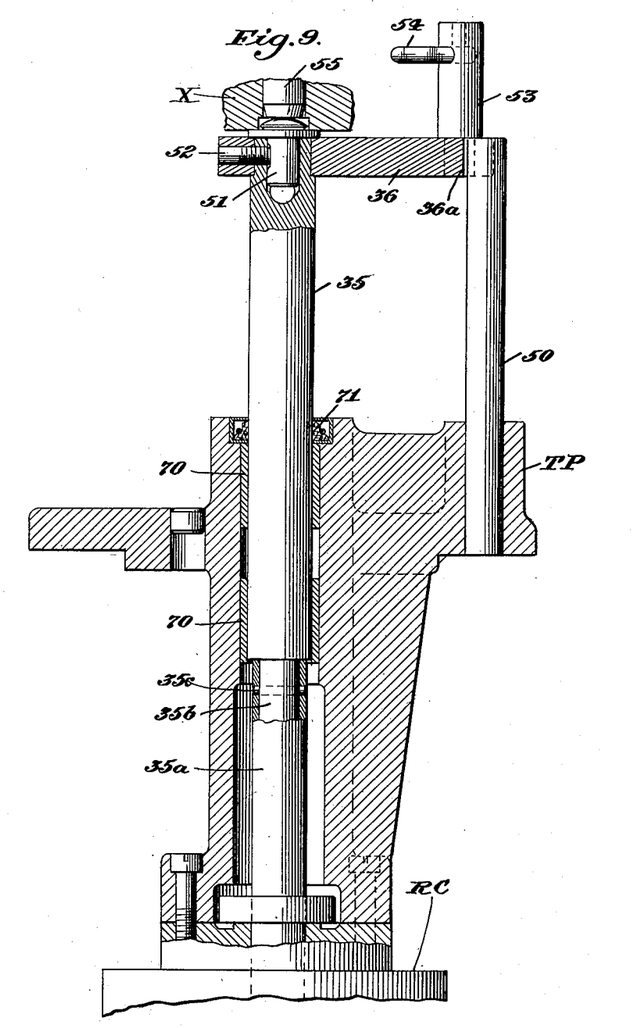
Figure 9 is an upright sectional view of the ram structure and certain associated parts substantially on line 9—9 of Fig. 8.

In Fig. 9, the ram cylinder RC is illustrated as having its plunger 35 formed in two parts, the lower part 35a being hollow to receive a reduced end 35b of the upper part and being secured thereto by a pin 35c. By this arrangement, work holders of varying heights may be employed with a single ram structure. Fig. 9 also shows the guiding of the upper portion of the plunger 35 by bushings 70 carried by a downward extension of the plate TP, and the provision of a packing 71 around the plunger 35 to exclude chips from the sliding bearing.

The operation of the structure is as follows:

At the start of a cycle, all of the work spindles WS are held in withdrawn position out of the work X by their corresponding working units W1, W2, W3 which are individually detained in such withdrawn position. The ram cylinder RC has its plunger 35 in the lowermost position. The valve TV is closed and the releasing devices WP1, WP2, WP3 are de-energized. The working unit valves WV1, WV2, WV3 are each in open position and so held by the corresponding working units W1, W2, W3. The handle 30 and its rocking actuator 21 are in the full line position of Fig. 2. The automatic valve AV is in its full line position and fluid under pressure may flow from the corresponding branch pipe 20a past the valve which is held open by the depressed stem 25 into conduit 29, and then to the upper end of the ram cylinder RC to hold the plunger in lowered position.

The attendant now places an article of work X upon the angle members 46 and pushes it along the same beneath the fingers 54 until it engages the stop posts 53. At this time, with the particular article of work illustrated, the central aperture thereof fits over the upward extension of the head of pin 51 and is substantially guided thereby.

The attendant now moves the handle 30 into the dotted line position (Fig. 2). Fluid under pressure now flows from pipe 20, by the corresponding branch 20a, through the valve which is held open by depressed stem 22 of control valve HV, through conduit 26 and its branch 26b to the right-hand end of power cylinder PC, causing a movement of the piston rod 32 toward the right, thus moving the rocking actuator 21 of automatic control valve AV to shut off the communication of branch pipe 20a with conduit 29 and cause a communication of this conduit 29 with the atmosphere, with the valve stem 25 in its new position; together with a depression of the valve stem 24 which shuts off the former communication of conduit 28 with the atmosphere and establishes a communication of branch pipe 20a with conduit 28, so that fluid under pressure now flows into the lower end of the ram cylinder RC. Simultaneously therewith, the release of stem 23 of the hand valve HV has shut off the flow of communication of the corresponding branch pipe 20a with conduit 27, and thus with the right-hand end of the power cylinder PC, and established communication of the right-hand end of this power cylinder PC through the valves WV1, WV2, WV3, which are now opened, with the atmosphere.

The ram plunger 35 is forced upward, carrying the article of work X with it, and presents the central aperture of the work to the fixture pin 55, and thus properly locates the work with respect to its axis and presses it against the lower end 64 of the aligning plunger 61. Ultimately, the work is pressed tightly up against the aligning plunger and against the guide and stop pins 66, while being held by the fixture pin 55, and in rigidly located position ready for the drilling thereof.

At this time, also, the upward extension of the pin 51 of plunger 35 has engaged the pin 56 and moved it upward so that the valve TV is opened. Fluid now flows from the conduit 26 by branch conduit 26a, open valve TV, conduit 26c into the releasing devices WP1, WP2, WP3 of the working units W1, W2, W3, so that the detaining means thereof are released and the units move their spindles WS forward for drilling the article of work X in this illustrative form, being guided by the bushings 65 in the usual way. The individual feeding mechanisms of the working units W1, W2, W3 cause these units to accomplish their prescribed functions individually and to return to withdrawn position.

As soon as the units begin to operate, the attendant releases the handle 30 so that fluid no longer flows from the corresponding branch conduit 20a into the conduit 26, but is directed instead toward branch conduit 27. The initial movements of any one of the work units W1, W2, W3 has, however, caused a closing of the corresponding valve WV1, WV2, WV3, so that fluid cannot flow into the right-hand end of the power cylinder PC, and the automatic valve AV remains in the dotted line position, thus holding the fluid medium in communication with the lower end of the ram cylinder RC.

As each unit completes its cycle, it returns and is latched by its corresponding detent, as at this time the conduit 26 is in communication with the atmosphere at the hand valve HV owing to the raised position of the stem 22, so that the releasing devices WP1, WP2, WP3 are de-energized and have returned to their initial position.

As soon as each work unit W1, W2, W3 returns to its withdrawn position, its corresponding screw 11 engages the stem 12 of the corresponding valve WV1, WV2, WV3 and opens this valve. Ultimately, all of these valves are open so that fluid under pressure can now flow through conduit 27 to the right-hand end of the power cylinder PC, and this cylinder now operates to move the piston rod 32 toward the left and move the rocking actuator 21 into the full line position again.

The stem 24 moves to its upper position when released and establishes communication between conduit 28 and the atmosphere in lieu of the former communication with the branch fluid pressure pipe 20a. The depression of the valve stem 25 shuts off the former communication of conduit 29 with the atmosphere and establishes communication between branch conduit 20a and conduit 29. Fluid now flows into the upper end of the ram cylinder RC and the pressure plate 36 is moved downward positively, its fingers 54 now operating as the strippers to assure the disengagement of the article of work X from the fixture pin 55 and other parts of the structure. The work X is thus carried down until it rests on the flanges provided by angle members 46, ready for withdrawal. At the initial stage of the downward movement of pressure plate 36, the stem 56 is released so that valve TV closes again.

This operation may be continued cyclically in the manner prescribed for each article of work, in this illustrative form.

While the particular structure is shown and described as employing a fluid pressure medium for accomplishing the supervised control and successive actuation of parts, and more specifically the use of air under pressure, it will be noted that the invention is not limited to this specific manner of practicing, and in general that the invention is not limited to the particular form of construction shown but that it may be modified in many ways within the scope of the appended claims.

I claim:

1. In a machine tool, a working unit including a tool and means for feeding the same and detaining means operative for normally holding the tool in withdrawn position, a work holder including means for locating the work relative to the working unit and a power device for presenting the work to and holding it at the locating means; a source of energy, means selectively operable for delivering energy from said source alternately to the power device and to the detaining means for effecting the release of the latter, power-actuated means actuated from said selectively operable means for controlling the delivery of energy from the selectively operable means to the power device for causing the latter to become energized selectively for effecting the presenting of the work at the locating means and its clamping thereat and for effecting release of the work, a first supervising control element normally occupying an obstructing position to prevent flow of energy from said selectively operable means to said detaining means and thereby effective to prevent release of said detaining means when the selectively operable means is in position for delivering energy toward the detaining means, said first control element being actuated upon movement of the work into presented position for permitting the flow of energy to said detaining means for the release of the same, and a second supervising control element normally occupying an obstructing position to prevent the flow of energy between the power-actuated means and said selectively operable means whereby to prevent movement of said power-actuated means and constructed and arranged to be moved to another position by the tool unit when said tool enters withdrawn position whereby to permit reversal of the power-actuated means and a release of the work.

2. In a machine tool including a working unit having a tool, means for feeding the same, detaining means operative for normally holding the tool in withdrawn position, and a normally closed first supervising element actuated by the tool at its return to withdrawn position, the combination of a source of power, work locating means, power means for presenting the work to and clamping it at the locating means, selective means effective in one position for controlling the said presenting means for causing it to present and clamp the work and effective in another position for causing the return of the presenting means, a manually operable selective member effective in a first position to connect said source for actuating said selective means into said one position thereof, means also energized from said source through said manually operable member when in its first position for releasing said detaining means, and including a second supervising element and a releasing device, said second supervising element being constructed and arranged for normally preventing energization of said releasing device and being positioned for actuation by the work when the work is presented in located position by said presenting means and being effective when actuated for the energization of said releasing device, said first supervising element being effective in its closed position to prevent movement of the selective means from said one position into said other position, and means including said first supervising element and connected for energization from said source through said manually operable member when in its second position and effective when said first supervising element is actuated for the movement of said selective means to said other position.

3. In a machine tool, a plurality of working units each including a tool and means for feeding the same and detaining means operative for normally holding the tool in withdrawn position; a work holder including work locating means and fluid pressure means for clamping the work with respect to the locating means; a first valve for selectively controlling the delivery of fluid to said pressure means for effecting the movement thereof, a fluid pressure device for moving said valve, separate devices for effecting the release of said detaining means in said working units, a first supervising valve positioned for actuation from said pressure means when the work is clamped, a first conduit controlled by said first supervising valve and connected in multiple to said releasing devices, a second conduit connected for energizing said fluid pressure device in one direction for causing said pressure means to clamp the work, separate valves each controlled by an associated working unit to be opened when the unit is in withdrawn position and to close when the unit departs from withdrawn position, a third conduit controlled by said separate valves connected in series therein and connected for permitting a fluid flow in said fluid pressure device for effecting operation of the work clamping means when all said separate valves are open and for preventing such fluid flow when any one of said valves is closed, and a manually operable valve for selectively controlling the delivery of fluid to said first and second conduits in multiple or to said third conduit.

4. In a machine tool, a working unit including a tool and means for feeding the same, detaining means operative for normally holding the tool in withdrawn position and means for releasing the detaining means, a work holder including means for locating the work relative to the working unit and a power device for presenting the work and clamping it to the locating means, a source of energy, power actuated means for controlling the delivery of energy to the power device for selectively effecting the presenting of the work at the locating means and the clamping of the work and for effecting release of the work, first and second conduits for conducting energy from said source, the second of said conduits having two branches, means selectively operable for alternately opening and closing said conduits for delivering energy from said source through said first conduit toward the power actuated means for actuating it in one direction and through one branch of said second conduit toward the power actuated means for actuating it in the other direction and through the other branch of said second conduit for delivering energy toward the detaining means for effecting release of the latter, a first supervisory control element occupying an obstructing position in said first conduit to prevent the flow of energy between said selectively operable means and the power actuated means to prevent the movement of said power actuated means in either direction and arranged to be moved to another position by the tool unit when said tool is in withdrawn position to permit the operation of the power actuated means to either clamp or release the work in accordance with the position of the selectively operable means; and a second supervising control element normally occupying an obstructing position in the branch of the second conduit conducting energy toward the releasing means to prevent flow of energy from said selectively operable means to the releasing means and thereby effective to prevent the release of said detaining means when the selectively operable means is in position for delivering energy toward the detaining means, said second supervisory control element being actuated upon movement of the work into presented position for permitting the flow of energy to the releasing means for releasing the detaining means when the work has been presented.

EDWARD JOSLIN KINGSBURY.